United States Patent
Grebnov et al.

(10) Patent No.: US 9,811,392 B2
(45) Date of Patent: Nov. 7, 2017

(54) PRECONDITION EXCLUSIVITY MAPPING OF TASKS TO COMPUTATIONAL LOCATIONS

(71) Applicant: Microsoft Technology Licensing, LLC, Redmond, WA (US)

(72) Inventors: Ilya Grebnov, Kirkland, WA (US); Stephen Siciliano, Bellevue, WA (US); Charles Lamanna, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 14/950,397

(22) Filed: Nov. 24, 2015

(65) Prior Publication Data

US 2017/0147413 A1    May 25, 2017

(51) Int. Cl.
*G06F 9/46* (2006.01)
*G06F 9/52* (2006.01)

(52) U.S. Cl.
CPC .................................. *G06F 9/528* (2013.01)

(58) Field of Classification Search
None
See application file for complete search history.

(56) References Cited

U.S. PATENT DOCUMENTS

| | | | |
|---|---|---|---|
| 6,456,996 B1 | 9/2002 | Crawford, Jr. et al. | |
| 6,606,529 B1 | 8/2003 | Crowder, Jr. et al. | |
| 7,194,710 B2 | 3/2007 | Prasad et al. | |
| 8,387,066 B1 | 2/2013 | Becher et al. | |
| 8,719,801 B2 | 5/2014 | Gulwani et al. | |
| 8,863,137 B2 | 10/2014 | Keller et al. | |
| 2002/0078124 A1* | 6/2002 | Baylor | G06F 9/3851 718/106 |

(Continued)

OTHER PUBLICATIONS

Nan, et al., "Optimal Task-Level Scheduling for Cloud Based Multimedia Applications", In Proceedings of IEEE International Conference on Acoustics, Speech and Signal Processing, May 26, 2013, 5 pages.

(Continued)

*Primary Examiner* — Dong Kim
(74) *Attorney, Agent, or Firm* — Ogilvie Law Firm (57) ABSTRACT

Computational tasks are mapped with computational locations in a distributed system such as a cloud computing environment. Mapping does not rely on workload estimates. Instead, tasks whose prerequisite tasks or other preconditions are determined to be mutually exclusive are co-located, while other tasks are mapped to different locations than one another. Locations are servers, processor cores, virtual machines, applications, or computational processes, for example. Mutual exclusivity may be determined by detecting that preconditions require different values of a shared variable in order to be satisfied, for example, or determining that preconditions correspond to different branches of a conditional programming statement. A satisfiability engine may also provide a satisfiability determination. Co-located tasks may also be batched, for improved execution performance. Co-location based on mutual exclusivity may result in fewer operations to save and restore task state, fewer cache misses, greater co-allocation of computational resources by the tasks, and easier debugging.

20 Claims, 2 Drawing Sheets

(56) References Cited

U.S. PATENT DOCUMENTS

| | | | |
|---|---|---|---|
| 2003/0023656 A1* | 1/2003 | Hutchison | G06F 9/524 718/100 |
| 2004/0025164 A1* | 2/2004 | Ma | G06F 11/362 718/107 |
| 2007/0150897 A1* | 6/2007 | Leeman | G06F 9/524 718/104 |
| 2007/0198519 A1* | 8/2007 | Dice | G06F 9/466 |
| 2008/0082805 A1* | 4/2008 | Wakabayashi | G06F 17/505 712/236 |
| 2011/0107340 A1* | 5/2011 | Gupta | G06F 9/4881 718/102 |
| 2012/0278800 A1* | 11/2012 | Nicholas | G06F 9/45558 718/1 |
| 2013/0185728 A1 | 7/2013 | Abdalla et al. | |
| 2013/0332910 A1* | 12/2013 | Ganai | G06F 11/3692 717/131 |
| 2013/0339972 A1 | 12/2013 | Zhang et al. | |
| 2014/0282574 A1 | 9/2014 | Marathe et al. | |
| 2014/0289733 A1 | 9/2014 | Fritz et al. | |
| 2015/0026438 A1* | 1/2015 | Giroux | G06F 9/38 712/225 |

OTHER PUBLICATIONS

"CIS 4307: Interleaving, Determinate Computations, Bernstein Conditions, Precedence Graphs", Retrieved on: Sep. 3, 2015, retrieved from <<http://cis-linux1.temple.edu/~ingargio/cis307/readings/interleave.html>>, 6 pages.

Pedarsani, et al., "Scheduling Tasks with Precedence Constraints on Multiple Servers", In Proceedings of 52nd Annual Allerton Conference on Communication, Control, and Computing, Sep. 30, 2014, 8 pages.

Calheiros, et al., "Meeting Deadlines of Scientific Workflows in Public Clouds with Tasks Replication", In Proceedings of IEEE Transactions on Parallel and Distributed Systems, vol. 25, Issue 7, Sep. 20, 2013, pp. 1-11.

Lam, Kevin., "What are Logic Apps?", Retrieved on: Sep. 9, 2015, retrieved from <<https://azure.microsoft.com/en-us/documentation/articles/app-service-logic-what-are-logic-apps/>>, 3 pages.

"Boolean satisfiability problem", retrieved from <<https://en.wikipedia.org/wiki/Boolean_satisfiability_problem>>, Aug. 28, 2015, 14 pages.

"Automated theorem proving", retrieved from <<https://en.wikipedia.org/wiki/Automated_theorem_proving>>, Sep. 22, 2015, 9 pages.

"Conditional (computer programming)", retrieved from <<https://en.wikipedia.org/wiki/Conditional_(computer_programming)>>, Sep. 28, 2015, 10 pages.

"Control flow analysis", retrieved from <<https://en.wikipedia.org/wiki/Control_flow_analysis>>, Jun. 1, 2015, 2 pages.

Virginia Mary LO, "Heuristic Algorithms for Task Assignment in Distributed Systems", IEEE Transactions on Computers, vol. 37, No. 11, Nov. 1988, 14 pages.

"Load balancing (computing)", retrieved from <<https://en.wikipedia.org/wiki/Load_balancing_(computing)>>, Oct. 16, 2015, 7 pages.

"Reasoning system", retrieved from <<https://en.wikipedia.org/wiki/Reasoning_system>>, Jul. 5, 2015, 5 pages.

"Satisfiability", retrieved from <<https://en.wikipedia.org/wiki/Satisfiability>>, May 26, 2015, 4 pages.

"Scheduling (computing)", retrieved from <<https://en.wikipedia.org/wiki/Scheduling_(computing)>>, Oct. 22, 2015, 13 pages.

"Semantic reasoner", retrieved from <<https://en.wikipedia.org/wiki/Semantic_reasoner>>, Aug. 2, 2015, 3 pages.

"Task Distribution", retrieved from <<http://www.cs.cmu.edu/afs/cs/project/jair/pub/volume9/cook98a-html/node3.html>>, no later than Nov. 4, 2015, 4 pages.

"Topological sorting", retrieved from <<https://en.wikipedia.org/wiki/Topological_sorting>>, Oct. 24, 2015, 6 pages.

\* cited by examiner

PRECONDITION EXCLUSIVITY MAPPING OF TASKS TO COMPUTATIONAL LOCATIONS

BACKGROUND

In some situations, multiple computational tasks to be executed are defined and are then assigned to one or more computational locations to be actually executed. For example, from a user's perspective a laptop computer may be running a word processor, playing background music, and receiving an email. Each of these activities involves one or more computational tasks. The word processor, for example, may involve a keyboard-reading task, a spell-checking task, and a screen update task. Within the laptop, a task scheduler or other facility is responsible for assigning the various tasks to the processor(s) to be executed. Depending on one's point of view, one may speak of assigning the tasks to the processor(s), or speak of assigning the processor(s) to the tasks. Either way, a mapping is made between one or more tasks and one or more processors.

In computing systems that are larger than a single laptop or other single device, hundreds or thousands of tasks may await assignment at any given point. After being assigned to particular servers or virtual machines, for example, the assigned tasks will be executed at the assigned location. Algorithms for assigning tasks in a system of computing devices are sometimes referred to as "task distribution" or "task allocation" algorithms. Again, one may speak either of assigning a task to a server, or of assigning a server to a task, for example.

Tasks may be randomly assigned to their execution locations. Tasks may be assigned locations depending on task priority, e.g., by giving kernel tasks and interrupts higher priority than some other tasks. When multiple servers (for example) are available, tasks may be assigned in a round-robin manner, e.g., in a two-server system task 1 is assigned server 1, task 2 is assigned server 2, task 3 is assigned server 1, task 4 is assigned server 2, and so on. Tasks may be assigned in a manner that balances the expected (or actual) workloads imposed on the servers, to avoid server idle time or at least give each server roughly the same amount of idle time. Combinations of these approaches may also be used, e.g., by initially assigning tasks to virtual machines randomly and then load balancing based on sampled or reported workloads as the tasks execute.

SUMMARY

Some embodiments are directed to the technical activity of mapping computational tasks to computational locations in a distributed system, e.g., a cloud computing environment. Some embodiments are directed to the related technical activity of mapping computational tasks to computational locations without relying on task-specific workload estimates. Servers, virtual machines, and other computational locations may be assigned to tasks. Other technical activities and variations pertinent to teachings herein will also become apparent to those of skill in the art.

Some embodiments attempt to determine a mutual exclusivity status of a task A and a task B. This is done by determining whether any precondition A_P for running task A is mutually exclusive of any precondition B_P for running task B. When the attempt succeeds in determining that at least one precondition A_P is mutually exclusive of at least one precondition B_P, then task A and task B are mapped to the same computational location as one another. Since only one of task A and task B will actually be executed, overhead associated with them is thus limited to their single shared location, instead of being incurred at two locations. When the attempt succeeds in determining that no precondition A_P is mutually exclusive of any precondition B_P, then task A and task B are mapped to different computational locations than one another. When the attempt fails to determine the mutual exclusivity status of task A and task B, then task A and task B are also mapped to different computational locations than one another.

Depending on the embodiment, mutual exclusivity status may be determined in various ways. For example, a precondition A_P is mutually exclusive of a precondition B_P when the preconditions share a variable, each precondition is satisfied if the variable lies within a respective precondition-specific value range, and the precondition-specific value ranges do not overlap one another. Also, a precondition A_P is mutually exclusive of a precondition B_P when the preconditions correspond to different branches of a conditional programming statement. A satisfiability engine, conventional or otherwise, may also provide a satisfiability determination on which to base the task mapping.

An embodiment may map tasks to computational locations without regard to workloads or other task-specific performance cost estimates, and rely instead on the described analysis of mutually exclusivity of task preconditions. Mutually exclusive tasks will then tend to be assigned the same computational location, while others are sent to different locations. Tasks mapped to the same location as one another may be batched together, may result in fewer operations to save and restore task state and fewer cache misses, and may increase co-allocation of computational resources by the tasks. An embodiment may provide a more efficient use of computational resources than a round-robin mapping or a random mapping of the computational tasks and computational locations would provide.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms

Some acronyms are defined below, but others may be defined elsewhere herein or require no definition to be understood by one of skill.

ALU: arithmetic and logic unit
API: application program interface
CD: compact disc
CPU: central processing unit
DVD: digital versatile disk or digital video disc
FPGA: field-programmable gate array
FPU: floating point processing unit
GPU: graphical processing unit
GUI: graphical user interface
RAM: random access memory
ROM: read only memory

Overview

Familiar approaches to mapping tasks with processors, servers, or other computing locations typically use some workload estimate, such as an estimate of how many processing cycles a given task will require, or how much memory or bandwidth it will use. Sometimes the estimates are entirely predictive with no underlying measurement, and sometimes the estimates are based on actual measurements together with an assumption that the measurements are reliable and representative of the computational resources the task will require. Either way, something must be known (or assumed) about the behavior of the task that is being mapped to a processing location.

Embodiments described herein may be fine-tuned in view of such estimates, or be used in conjunction with such estimates, but they do not all rely on such estimates. Tasks and locations can be assigned to one another without making assumptions about the relative performance cost of one task versus another task. Only the mutual exclusivity of tasks, or lack of mutual exclusivity, need be considered. When only one task in a collection of two or more tasks will actually be executed, dues to the tasks being mutually exclusive of one another, the overhead associated with the tasks is limited to a single shared location by assigning all those mutually exclusive tasks (or a plural subset of them, at least) to a single processing location. Thus, the overhead is incurred at fewer locations than it would have been if the tasks were assigned to more locations.

Some aspects of embodiments described herein originated in an effort to make performance improvements to the linear sequencer for the Microsoft Azure™ App Plat—Logic Apps (mark of Microsoft Corporation). Prior to implementing and testing an optimized method of assigning tasks to virtual machines, the Azure™ platform for logic apps used a greedy approach: virtual machines would simply keep asking for more work from a queue. With one optimizing method, virtual machines continue to ask for more work, but could get a batch of actions which they execute sequentially instead of getting an individual task. In tests, an implementation created a tenfold improvement to performance, using optimizations to the calculation of "actions" in a distributed graph of calculations based on analysis of pairs of nodes within the graph, and analysis of conditional logic associated with each node as taught herein.

Azure™ App Plat Logic App "actions" may be used in production rule systems, and such actions may be viewed collectively within a rule and/or individually as examples of the computational "tasks" discussed herein which get mapped to computational locations. Production rule preconditions can likewise be viewed individually or in Boolean combinations as the preconditions of the computational tasks discussed herein. However, the present teachings are not limited to tasks which operate as production rule actions, and the present teachings are also not limited to task preconditions which operate as production rule preconditions or production rule trigger conditions. The optimizations taught herein can be applied in distributed computing systems, concurrent computing systems, parallel computing systems, leader election systems, N-tier architectures, cluster computing, highly coupled, loosely coupled, client-server systems, and peer-to-peer systems, for example, in addition to distributed production rule systems.

Nonetheless, production rule systems are an example worth noting. Production rule systems are used, for instance, in expert systems, business process management, automated planning, and other fields. A production rule system, sometimes also called a "production system", is a computing system which operates by checking trigger conditions defined in productions (also called "rules" or "production rules") and then taking corresponding actions when the trigger conditions are met. A production rule includes one or more preconditions which collectively form the rule's trigger condition. When the trigger condition is satisfied, corresponding actions are taken. Productions typically consist of two parts: a trigger condition (sometimes called the "IF portion" or "IF statement") and a corresponding group of one more actions (also called the "THEN portion"). Some productions may also have an ELSE portion, whose actions are performed when the trigger condition is not satisfied. The trigger conditions typically involve a set of variables, sometimes called "working memory", which contain data (sometimes called "facts" or "data tuples") representing the states of pertinent real-world items. A rule engine (sometimes called a "rule interpreter") compares the variables in working memory to the trigger conditions, fires rules whose trigger conditions are met, and takes the corresponding actions. It is not unusual for a taken action to modify the state of working memory, which may lead in turn to other rules being triggered, or to the same rule being triggered again with different facts.

In some embodiments, which may include a cloud-based production rule system and/or other distributed computing systems or other systems noted herein, optimization includes forming graph of actions or computations to be executed, in which each node in the graph is associated with conditions that are prerequisites to executing the actions or computations identified by that node. Pairs of nodes are analyzed, and preceding conditions (a.k.a. preconditions or prerequisites) associated with nodes evaluated, to determine whether the conditions for two nodes are mutually exclusive. If two nodes are contradictory in the sense of being mutually exclusive, (e.g., one node's actions will execute, or the other node's, but not both, because they have at least one pair of respective opposite preceding conditions), then the nodes' actions are not assigned to separate computing resources, and they are not executed in parallel. If two nodes are not contradictory, they can be split up and distributed across different virtual machines or other computer resources. After pairwise evaluation across the graph, whole linear sequences of actions can be grouped together for one node. Linear sequences can be further optimized by considerations of efficiency of operations on one resource (e.g., one machine) due to caching, initializations, etc.

One method includes receiving a graph of nodes, the graph including a first node and a second node, the first node associated with a first computational task and the second node associated with a second computational task, and the first node associated with a condition and the second node associated with a second condition; determining, by a satisfiability analysis of the first node and the second node that the first and second nodes are not mutually satisfiable; and in response to determining the first and second nodes are not satisfiable according to the analysis, scheduling the first computational task and the second computational task linearly on a computational resource. The computational resource may be a virtual machine, for instance. The computational task may be an action defined for an application.

Some embodiments described herein may be viewed in a broader context. For instance, concepts such as efficiency, locations, mapping, prerequisites, and tasks may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving efficiency, locations, mapping, prerequisites, and/or tasks are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities such as task assignment and virtual machine allocation. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein map tasks and processing locations based on mutual exclusivity of task prerequisites. Third, technical effects provided by some embodiments include fewer operations to save and restore task state, more cache hits (fewer misses), and greater sharing (co-allocation) of computational resources between tasks. Other aspects of technical character will also be apparent to those of skill in the computing arts.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization) and/or capable of or subject to being assigned to a particular computational location. A thread may also be known by another name, such as "task," "unit of work", "computational task", "action", "process," or "coroutine," for example, in a given implementation; "task" and "action" in particular are used in many examples herein. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multiprocessor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "computational location" is a location which includes at least one processor and is capable of processing a task. Some examples of computational locations include a processor with one or more cores, a particular processor core, a server process, a server machine ("server" means a server process and/or a server machine), a virtual machine, an application, and a computational process, e.g., a computational process having an assigned address space, having a kernel-assigned process ID, or having another feature which characterizes it tp one of skill as a computational process.

"Kernels" include operating systems, hypervisors, virtual machines, BIOS code, and similar hardware interface software.

"Code" means processor instructions, data (which includes constants, variables, and data structures), or both instructions and data.

"Optimize" means to improve, not necessarily to perfect. For example, it may be possible to make further improvements in a program which has been optimized.

"Program" is used broadly herein, to include applications, kernels, drivers, interrupt handlers, firmware, state machines, libraries, and other code written by programmers (who are also referred to as developers).

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

A "round-robin" mapping of computational tasks and computational locations maps tasks with locations (or vice versa) turn by turn and then around again and again until complete. For example, if there are five virtual machines VM0 through VM4 then tasks could get assigned to virtual machines like this: Set j equal to 0; while there are more tasks, assign the next task to VMj and then increment j by 1 modulo 5.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Similarly, operations such as mapping computational locations with computational tasks are understood herein as requiring and providing speed and accuracy (as well as communications via digital data transmissions) that are not obtainable by human mental steps. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as analyzing, assigning, attempting, batching, co-allocating, determining, executing, forming, hitting, mapping, missing, optimizing, providing, receiving, restoring, running, saving, selecting, sequencing, submitting (and analyzes, analyzed, assigns, assigned, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. As used herein, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

Figure 1:
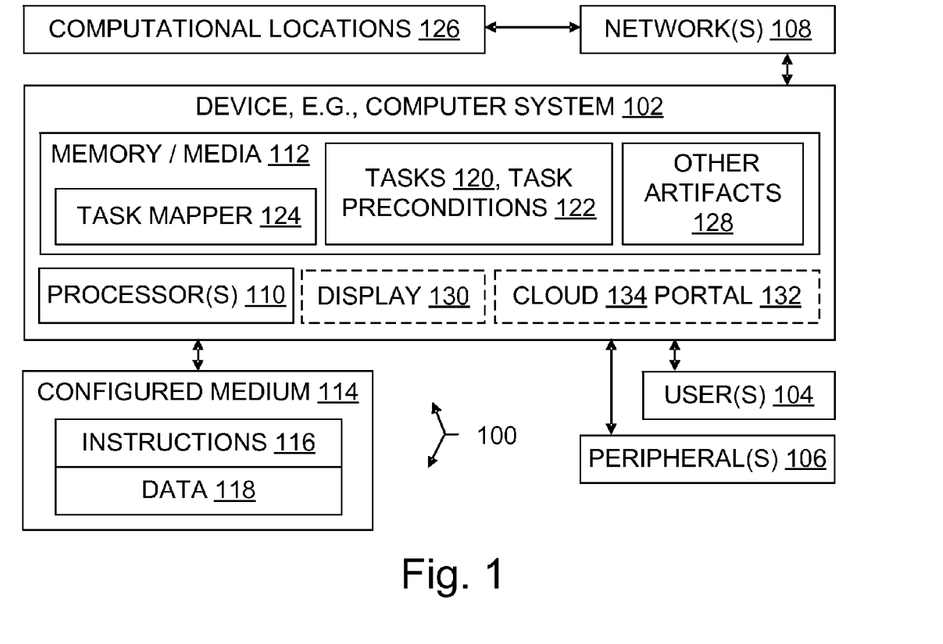
FIG. 1 is a block diagram illustrating a computer system having at least one processor and at least one memory which interact with one another under the control of software for mapping computational locations to computational tasks, and other items in an operating environment which may be present on multiple network nodes, and also illustrating configured storage medium (as opposed to a mere signal) embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation) or a collection of servers, for individual, paired player, and/or multiplayer games. The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more tasks 120 have preconditions 122, which may be expressed for example in terms of range constraints on variable values, outcomes of evaluating Boolean and/or numerical expressions, results of calling routines, flag settings, permissions, software or hardware resource availabilities, machine states, chronological constraints, load parameters, and/or other prerequisites to execution of the respective tasks 120. A task mapper 124 maps tasks 120 to computational locations 126, or equivalently for present purposes, maps computational locations 126 to tasks 120. The mapping may be done randomly, in a round-robin manner, using teachings herein for optimization, and/or in other ways, depending on the situation. Although some computational locations 126 are shown in FIG. 1 connected to the most prominent illustrated device 102 by network(s) 108, in some configurations such a device 102 includes two or more computational locations 126. When a system 102 includes multiple machines connected by local area network, wide area network, or other network 108 infrastructure, a given device may include a portal 132 to other devices of the systems 102. In particular, a device may include a portal 132 to a computing cloud 134, e.g., a set of computational resources which is provided by a third party as a service whose scale varies according to the service recipient's changing demands.

In addition to tasks 120 and the task mapper 124, a system 102 may include other digital artifacts 128, e.g., a kernel, database, application programs, diagnostic utilities, software development tools, data such as images, music, video, text, executable code, object code libraries, and other data. The tasks 120, task mapper 124, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s) 130, and battery(ies), an operating environment may also include other hardware, such as buses, power supplies, wired and wireless network interface cards, and accelerators, for instance, whose respective operations are described herein to the extent not already apparent to one of skill. The display 130 may include one or more touch screens, screens responsive to input from a pen or tablet, or screens which operate solely for output.

One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Systems

Figure 2:
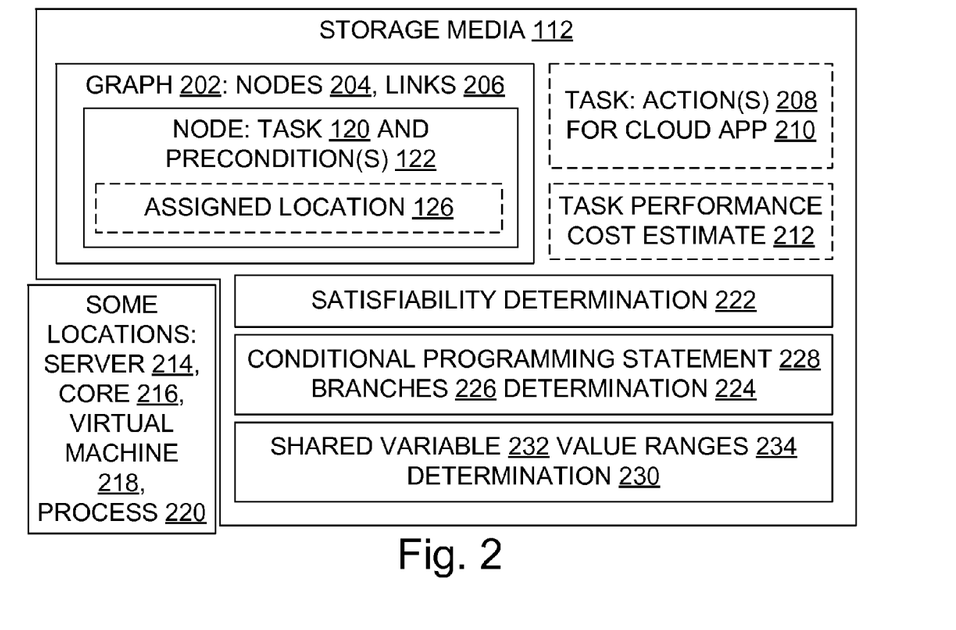
FIG. 2 is a block diagram illustrating aspects of an example architecture for mapping computational locations to computational tasks.

FIGS. 1 and 2 illustrate aspects of an architecture which is suitable for use with some embodiments. A computational system 102 includes at least one processor 110 and a memory 112 in operable communication with the processor. A graph 202 linked node data structure resides in the memory. The graph 202 has nodes 204 which represent tasks 120 and task preconditions 122. For example, a field of a node object may include a pointer to a list of task IDs. The graph also has links 206 which represent task dependencies. For instance, when preconditions are defined in terms of the order in which tasks execute, the links 206 may point to other nodes, e.g., task A execution is a precondition of task B execution when a link points from the node representing task B back to the node that represents task A. More generally, a link 206 may be a pointer to one or more data structures representing preconditions 122, such as constraints on a variable or indications that a certain object has been locked, or that it is not locked. One of skill may draw on regular expression, Boolean expression evaluations, collection membership tests, function structures used in functional programming languages, and/or other tools and techniques to implement data structures representing preconditions 122 in a given system 102.

Figure 3:
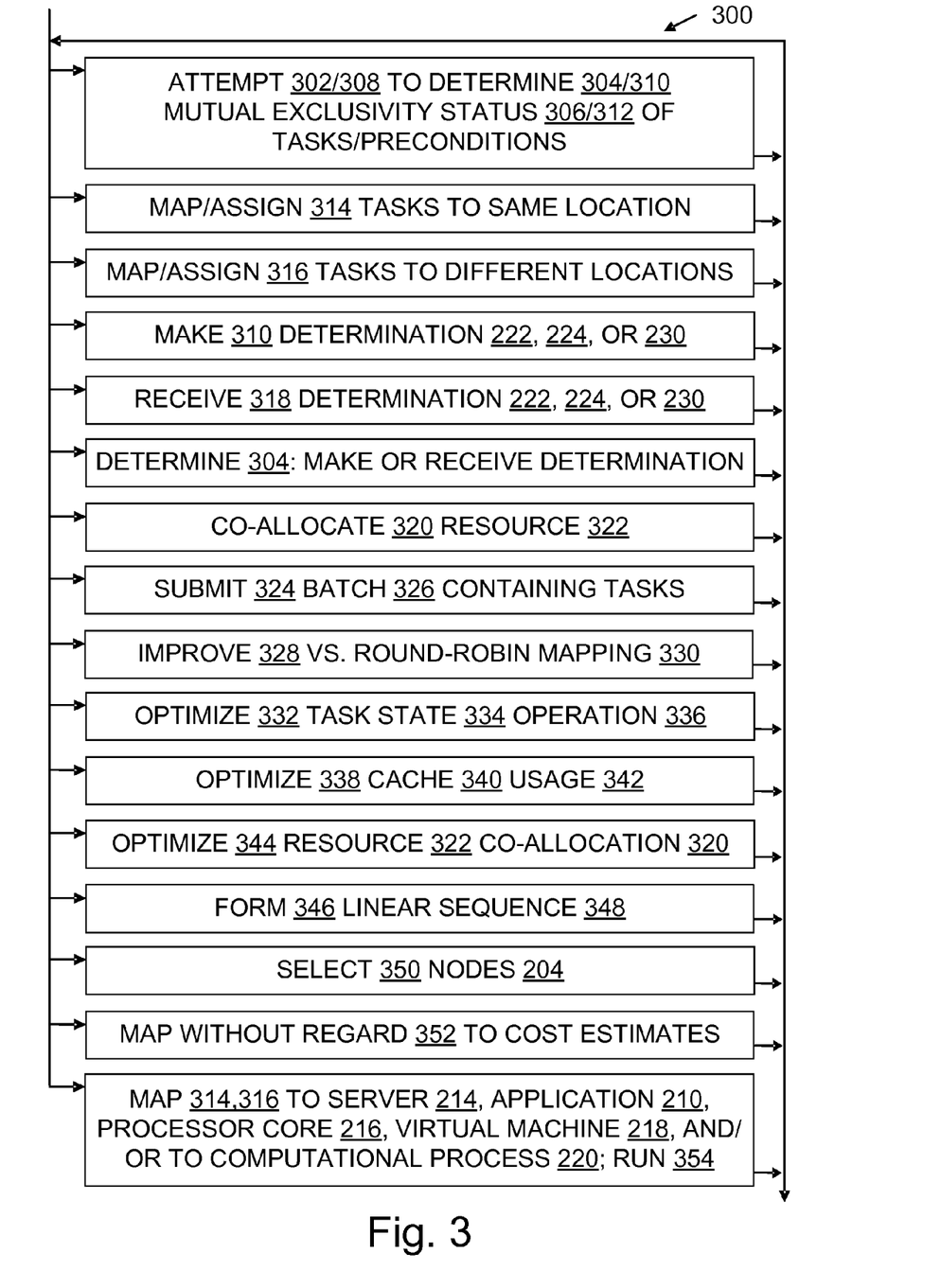
FIG. 3 is a flow chart illustrating aspects of some process and configured storage medium embodiments.

In some embodiments, mapping software 124 also resides in the memory (RAM, hard disk, or other digital storage device 112.). Upon execution by at least one processor, the mapping software 124 performs an optimizing method of mapping computational tasks 120 to computational locations 126. In some embodiments, the optimizing method includes repeating the following a plurality of times with different pairs of nodes: selecting 350 a pair of nodes 204, attempting to determine whether the node tasks 120 of the selected nodes have mutually exclusive preconditions 122, and assigning the node tasks to the same computational location 126 when the node tasks are determined to have mutually exclusive preconditions and otherwise assigning the node tasks to different computational locations 126. Selection 350 may be accomplished, for example, by building a graph 202 whose nodes 204 are in topological order and checking adjacent pairs of nodes 204.

As a particular illustration, some embodiments include at least five computational locations 126, to each of which the mapping software 124 has mapped at least one task 120. However, depending on the system 102 and environment 100, the number of tasks 120 and locations 126 may vary widely. The simplest system has two tasks and two locations, while a complex system may have thousands of tasks 120 and hundreds or thousands of locations 126. Variations of kind are also contemplated, as well as variations in number. Tasks 120 may be production rule actions 208, continuations, threads, jobs, and/or other kinds of executable/interpretable software artifacts. The computational locations 126 may be one or more of the following: a server 214, 102, a processor 110 core 216, a virtual machine 218, an application 210, a computational process 220. One of the benefits of the present teachings is their ready adaptability to a wide variety of systems.

In some embodiments, at least three preconditions 122 are mutually exclusive of one another, and the tasks 120 corresponding to the at least three preconditions are mapped to the same computational location 126 as one another. As a result, the system 102 has a greater co-allocation of computational resources by the tasks than if the tasks had been mapped to two or more different computational locations.

In some embodiments, the mapping software 124 analyzes mutually exclusivity of task preconditions using a received satisfiability determination 222. The term "satisfiability" is used in different ways in computational, mathematical, and other technical literature. As used herein, it pertains to the mutual exclusivity of task preconditions. Two preconditions 122 are said herein to be satisfiable (or mutually satisfiable) if they are not mutually exclusive, that is, if they can both be satisfied. If they are satisfiable, they will be mapped to different locations 126.

Depending on the way "satisfiability" is used, the technical literature may state flatly that satisfiability is undecidable. It is correct that, in general, the question whether sentences in first-order logic are satisfiable is not decidable. However, the question whether a sentence in propositional logic is satisfiable is decidable. Moreover, embodiments of the task mapper 124 or related technical processes may recognize the possibility that satisfiability may be indeterminate in a particular situation, and detect (e.g., by timeout) that eventuality and respond to it in a way that does not halt task allocation or destroy all benefits of task mapping as taught herein. Thus, some embodiments attempt to determine mutual exclusivity, but if mutual exclusivity is not determined (e.g., if mutual satisfiability of particular preconditions is not decided after a specified time period such as one second) then task mapping proceeds nonetheless, by mapping the tasks of the preconditions in question onto different locations 126.

In addition, some embodiments receive satisfiability determinations 222 from an external source, which is presumably tailored and engineered to make such determinations in the environment at hand. For example, although there are no known algorithms that efficiently, correctly, and for all possible input instances solve the satisfiability problem of determining if there exists an interpretation that satisfies a given Boolean formula, as a practical matter heuristic algorithms have been developed and used in artificial intelligence, circuit design, and automatic theorem proving. Such heuristic algorithms may be harnessed to provide satisfiability determinations 222 in some environments 100.

In some embodiments, the mapping software 124 analyzes mutually exclusivity of task preconditions using a determination 224 that the preconditions 122 correspond to different branches 226 of a conditional programming statement 228. For example, a switch statement in C, C#, C++, or many other familiar programming languages is an example of a conditional programming statement 228 which has multiple branches 226. The following switch statement has four branches:

```
switch (counter) {
    case 1: printf("Branch 1."); break;
    case 2: printf("Branch 2."); break;
    case 3: printf("Branch 3."); break;
    default: printf("Branch 4."); break;
}
```

Similar switch-like statements 228 exist in many languages, using keywords such as case, select, or select. If-then statements, If-then-else statements, jz assembly instructions (jump if zero), and many other conditional programming statements 228 also exist. For present purposes, a characteristic shared by all these statements is that they can be used to write code in which multiple branches of control flow are present and only one of the branches will be taken in response to the value of one or more variables that control the flow. Hence, the branches are mutually exclusive of one another, and the precondition for each branch—that the control flow variable be such as to direct flow down that branch—is mutually exclusive of the corresponding preconditions of the other branches.

Determinations 224 that the preconditions 122 correspond to different branches 226 of a conditional programming statement 228 may be viewed as special cases of determinations 230 that a shared variable 232 has mutually exclusive value ranges 234. In the case of conditional programming statements 228, a determination 224 can sometimes be viewed as a determination 230 that the preconditions depend on different respective value ranges of a shared variable. In the switch statement above, the shared variable 232 is named "counter" and the four value ranges 234 are the single value 1, the single value 2, the single value 3, and all other values that can be assumed by the variable counter. Note that the term "range" as used herein thus includes a single value as a range, multiple consecutive values as a range, or indeed any set of values. For instance, the fourth range for counter would include all negative integers representable on the machine in an integer value having the number of bits allocated to counter, plus zero, (skipping 1, 2, and 3), plus 4, 5, 6, and so on up to and including the largest positive integer representable on the machine in an integer having the number of bits allocated to counter.

In some embodiments, the node tasks 120 include actions 208 defined for applications 210 executing in a cloud computing environment 134. For example, the actions 208 may be particular kinds of tasks 120 in that they are defined in the THEN portion or ELSE portion of IF-THEN rules or IF-THEN-ELSE rules in a cloud-based production rule system 102.

In some embodiments, the mapping software 124 maps 352 tasks 120 to computational locations 126 without regard to task-specific performance cost estimates 212. The mapping software 124 relies instead on an analysis of mutually exclusivity of task preconditions 122, as described herein. Mapping 352 may include mapping 314 tasks to co-locate them, mapping 316 tasks to different locations, or both.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Processes

FIG. 3 illustrates some process embodiments in a flowchart 300. Technical processes shown in the Figures or otherwise disclosed may be performed in some embodiments automatically, e.g., by a task mapper requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide or use an optimizing method of mapping between computational tasks and computational locations. This method includes attempting 302 to determine 304 a mutual exclusivity status 306 of a task A and a task B. This may be accomplished, at least in part, by attempting 308 to determine 310 a mutual exclusivity status 312 of task preconditions, e.g., determining 310 whether any precondition A_P for running task A is mutually exclusive of any precondition B_P for running task B. When the attempting 302 and/or 308 succeeds in determining 310 that at least one precondition A_P is mutually exclusive of at least one precondition B_P, then the method maps 314 task A and task B to the same computational location as one another. When the attempting 302/308 succeeds in determining 310 that no precondition A_P is mutually exclusive of any precondition B_P, then the method maps 316 task A and task B to different computational locations than one another. Also, when the attempting 302 fails to determine 304 the mutual exclusivity status of task A and task B, then the method maps 316 task A and task B to different computational locations than one another.

In some embodiments, the method determines 310 that a precondition A_P is mutually exclusive of a precondition B_P by making a determination 230 that the preconditions share a variable 232, that each precondition is satisfied if the variable 232 lies within a respective precondition-specific value range 234, and that the precondition-specific value ranges do not overlap one another. It is possible, but not necessary, for the value ranges to encompass every possible value of the shared variable 232. Alternatively, the method may receive 318 a determination 230 from an external source, e.g., a parser external to a particular device 102 on which the method is running. As an example, in some cases the method determines 310 that a precondition A_P is mutually exclusive of a precondition B_P by making 310 or receiving 318 a determination 224 that the preconditions correspond to different branches of a conditional programming statement.

In some embodiments, the method determines 310 that a precondition A_P is mutually exclusive of a precondition B_P based on a received 318 satisfiability determination 222. Alternatively, the method may make 310 the determination locally, using a heuristic algorithm for satisfiability analysis which is adapted from artificial intelligence software, automated theorem proving software, or circuit design software 128.

In some examples, the method determines 310 that at least one precondition A_P is mutually exclusive of at least one precondition B_P. In response to the determination, the method maps 314 task A and task B to the same computational location as one another, and also co-allocates 320 at least one computational resource 322 for both task A and task B. Some examples of computational resources 322 include regions of memory 112, processor 110 cycles, access to peripherals 106, network 108 access, and/or software artifacts 128 such as data objects, files, databases, and other software-generated items.

In some examples, the method determines 310 that at least one precondition A_P is mutually exclusive of at least one precondition B_P. In response to the determination, the method maps 314 task A and task B to the same computational location as one another, and also submits 324 a batch 326 to run on the computational location, with the batch containing task A and task B as actions 208 within the batch.

Although some examples herein discuss pairwise comparison of preconditions to determine 310 their mutual exclusivity status 312, more than two preconditions 122 may also be compared. In some case, the method determines 310 that at least three preconditions are mutually exclusive of one another. Each of the at least three preconditions may have a corresponding task 120, and the method maps 314 all of the corresponding tasks to the same computational location 126 as one another.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a task preconditions graph 202, task mapper 124, and determinations 222, 224, 230, in the form of data 118 and instructions 116, read from a removable medium 114 and/or another source such as a network connection, to form a configured medium. The configured medium 112 is capable of causing a computer system to perform technical process steps for task location mapping based on precondition mutual exclusivity analysis as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Some embodiments provide or utilize a computer-readable storage medium 112 configured with software 124 which upon execution by at least one processor 110 performs an optimizing method of mapping 314, 316 computational tasks 120 to computational locations 126. This optimizing method includes attempting 302 to determine a mutual exclusivity status 306 (e.g., a Boolean value indicating whether mutual exclusivity is known to be present) of a task A and a task B by determining 310 whether any precondition A_P for running task A is mutually exclusive of any precondition B_P for running task B. When the attempting succeeds in determining 310 that at least one precondition A_P is mutually exclusive of at least one precondition B_P, then the method includes mapping 314 task A and task B to the same computational location 126 as one another. However, when the attempting succeeds in determining 310 that no precondition A_P is mutually exclusive of any precondition B_P, or when the attempting 302 fails to determine the mutual exclusivity status of task A and task B, then the method includes mapping 316 task A and task B to different computational locations than one another. This optimizing method may provide 328 a more efficient use of computational resources than a round-robin mapping 330 of the computational tasks and computational locations would provide, for example. In particular, a method may map 314, 316 tasks to computational locations 126 that include virtual machines 218 in a cloud 134 computing environment.

Determination 302 of task mutual exclusivity follows from the underlying task preconditions' determination(s) 310: two or more tasks are mutually exclusive if any of their required preconditions are mutually exclusive, and the tasks are not mutually exclusive when none of their required preconditions are mutually exclusive.

In some cases, the optimizing method determines 310 that a precondition A_P is mutually exclusive of a precondition B_P in that the preconditions share a variable 232, each precondition is satisfied if the variable lies within a respective precondition-specific value range 234, and the precondition-specific value ranges do not overlap one another. In some cases, the method determines 310 that a precondition A_P is mutually exclusive of a precondition B_P based on at least one of the following: a received satisfiability determination 222, or a determination 224 that the preconditions correspond to different control flow branches 226 of a conditional programming statement 228.

In some embodiments, the optimizing method provides a more efficient use of computational resources than a round-robin mapping of the computational tasks and computational locations would provide, in at least one of the following ways: the optimizing method's task location mapping optimizes 332 in that it results in fewer operations 336 to save and restore task state 334; the optimizing method optimizes 338 in that it results in fewer cache misses, i.e., more cache hits, during usage 342 of a cache 340; the optimizing method optimizes 344 in that it results in greater co-allocation 320 of computational resources 322 by the co-located tasks. Similarly, in some embodiments the optimizing method (possibly in the form of an innovative task mapper 124) provides a more efficient use of computational resources 322 than a random mapping of the computational tasks and computational locations would provide. Moreover, use of the optimized method can make debugging easier by keeping task execution logs on the same virtual machine, as a result of co-locating tasks.

As to co-located tasks, in some embodiments, the optimizing method further includes forming 346 a linear sequence 348 of at least three tasks 120 which have been mapped 314 to a given computational location 126. One implementation, for example, includes a "SequencedAction" or batched action. In this implementation, the virtual machines that execute 354 actions are not aware of the optimizing method as such; they simply execute actions as they get them. Internally this single SequencedAction action reads state 334 from storage 112, executes multiple actions sequentially, and then save states to storage. So from the virtual machine's point of view the number of actions to execute has been reduced, but the system still runs 354 the same number of computation operations internally. In a best case, an entire graph of actions or other tasks could be reduced by the optimizing method to a single SequencedAction or the like for one virtual machine or other computational location 126 to execute 354.

Some Additional Observations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

As discussed, an aspect of some embodiments involves putting computation A and computation B on the same virtual machine in a linear sequence if only one of A or B will be executed, and putting them on different virtual machines if they can both be executed. If actions run in parallel it is more efficient to run them on different machines, from a latency point of view. But if it is known that actions do not run in parallel, e.g., if actions are mutually exclusive in that one is executed and another is always skipped, then it is more efficient to run them on same machine due to resources co-allocation and batching.

As another example, consider the following actions:
A: if (candidate.score <80) then mail(rejection, candidate);
B: if (candidate.score >=80) then mail(acceptance, candidate);
Actions A and B do not depend on each other, so they could run in parallel, but parsing can make it known to a system that they are mutually exclusive (the conditions are contradictive), so in this case one should locate both action A and B sequentially on single machine. Note that the actual order of execution 354 doesn't matter, because one will be skipped and only one will be executed.

As yet another example, consider a case of a service having actions to compensate for previous action failures:
A: Some action, such as calling an external service.
B: If Action['A'].status=='succeeded', do something else (continue case).
C: If Action['A'].status !='succeeded', send email. (terminate case)
In this example all actions A, B, C should be executed on same machine because A should normally run first to set the status, and because B and C are mutually exclusive.

There is typically a performance penalty assonated with starting an action or other task 120, since the system typically loads task state 334 from external storage 112 such as a hard disk. Since it is known that actions will run on same machine, the system need only load state once for a batch of actions. Actions also share similar state/code, so this also tends to improve caching and allocations. Basically, an optimized system 102 gets the benefit of running actions as a batch instead of as individual actions.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An optimizing method of mapping between computational tasks and computational locations, the method comprising:
    attempting to determine a mutual exclusivity status of a task A and a task B by determining whether any precondition A_P for running task A is mutually exclusive of any precondition B_P for running task B;
    when the attempting succeeds in determining that at least one precondition A_P is mutually exclusive of at least one precondition B_P, then mapping task A and task B to the same computational location as one another;
    attempting to determine a mutual exclusivity status of a task C and a task D by determining whether any precondition C_P for running task C is mutually exclusive of any precondition D_P for running task D;
    when the attempting succeeds in determining that no precondition C_P is mutually exclusive of any precondition D_P, then mapping task C and task D to different computational locations than one another; and
    attempting to determine a mutual exclusivity status of a task E and a task F by determining whether any precondition E_P for running task E is mutually exclusive of any precondition F_P for running task F;
    when the attempting fails to determine the mutual exclusivity status of task E and task F, then mapping task E and task F to different computational locations than one another.

2. The method of claim 1, wherein the method determines that a precondition A_P is mutually exclusive of a precondition B_P in that the preconditions share a variable, each precondition is satisfied if the variable lies within a respective precondition-specific value range, and the precondition-specific value ranges do not overlap one another.

3. The method of claim 1, wherein the method determines that a precondition A_P is mutually exclusive of a precondition B_P based on a received satisfiability determination.

4. The method of claim 1, wherein the method determines that a precondition A_P is mutually exclusive of a precondition B_P in that the preconditions correspond to different branches of a conditional programming statement.

5. The method of claim 1, wherein the computational locations are each one or more of the following: a server, a processor core, a virtual machine, an application, a computational process.

6. The method of claim 1, comprising determining that at least one precondition A_P is mutually exclusive of at least one precondition B_P, mapping task A and task B to the same computational location as one another, and co-allocating at least one computational resource for both task A and task B.

7. The method of claim 1, comprising determining that at least one precondition A_P is mutually exclusive of at least one precondition B_P, mapping task A and task B to the same computational location as one another, and submitting a batch to run on the computational location, the batch containing task A and task B as actions within the batch.

8. The method of claim 1, comprising determining that at least three preconditions are mutually exclusive of one another, each of the at least three preconditions having a corresponding task, and mapping the corresponding tasks to the same computational location as one another.

9. A computer-readable storage medium configured with software which upon execution by at least one processor performs an optimizing method of mapping computational tasks to computational locations, the optimizing method comprising:
    attempting to determine a mutual exclusivity status of a task A and a task B by determining whether any precondition A_P for running task A is mutually exclusive of any precondition B_P for running task B;
    when the attempting succeeds in determining that at least one precondition A_P is mutually exclusive of at least one precondition B_P, then mapping task A and task B to the same computational location as one another;
    attempting to determine a mutual exclusivity status of a task C and a task D by determining whether any precondition C_P for running task C is mutually exclusive of any precondition D_P for running task D;
    when the attempting succeeds in determining that no precondition C_P is mutually exclusive of any precondition D_P, then mapping task C and task D to different computational locations than one another; and
    attempting to determine a mutual exclusivity status of a task E and a task F by determining whether any precondition E_P for running task E is mutually exclusive of any precondition F_P for running task F;
    when the attempting fails to determine the mutual exclusivity status of task E and task F, then mapping task E and task F to different computational locations than one another;

wherein the optimizing method provides a more efficient use of computational resources than a round-robin mapping of the computational tasks and computational locations would provide.

10. The computer-readable storage medium of claim 9, wherein the optimizing method determines that a precondition A_P is mutually exclusive of a precondition B_P in that the preconditions share a variable, each precondition is satisfied if the variable lies within a respective precondition-specific value range, and the precondition-specific value ranges do not overlap one another.

11. The computer-readable storage medium of claim 9, wherein the method determines that a precondition A_P is mutually exclusive of a precondition B_P based on at least one of the following: a received satisfiability determination, or a determination that the preconditions correspond to different branches of a conditional programming statement.

12. The computer-readable storage medium of claim 9, wherein the optimizing method further comprises forming a linear sequence of at least three tasks which have been mapped to a given computational location.

13. The computer-readable storage medium of claim 9, wherein the computational locations include virtual machines in a cloud computing environment.

14. The computer-readable storage medium of claim 9, wherein the optimizing method provides a more efficient use of computational resources than a round-robin mapping of the computational tasks and computational locations would provide, in at least one of the following ways:
the optimizing method results in fewer operations to save and restore task state;
the optimizing method results in fewer cache misses;
the optimizing method results in greater co-allocation of computational resources by the tasks.

15. A computational system comprising:
at least one processor;
a memory in operable communication with the processor;
a graph residing in the memory, the graph having nodes which represent tasks and task preconditions, the graph also having links which represent task dependencies; and
mapping software residing in the memory which upon execution by at least one processor performs an optimizing method of mapping computational tasks to computational locations, the optimizing method including: attempting to determine whether a task A and a task B of a node AB have mutually exclusive preconditions, assigning the node AB tasks A and B to the same computational location when the node AB tasks A and B are determined to have mutually exclusive preconditions, attempting to determine whether a task C and a task D of a node CD have mutually exclusive preconditions, failing to determine a mutual exclusivity status of node CD tasks C and D, and assigning the node CD tasks C and D to different computational locations.

16. The system of claim 15, wherein the node tasks include actions defined for applications executing in a cloud computing environment.

17. The system of claim 15, wherein the mapping software maps tasks to computational locations without regard to task-specific performance cost estimates and relies instead on analysis of mutually exclusivity of task preconditions.

18. The system of claim 15, further comprising at least five computational locations to each of which the mapping software has mapped at least one task.

19. The system of claim 15, wherein:
the computational locations are each one or more of the following: a server, a processor core, a virtual machine, an application, a computational process; and
the mapping software analyzes mutually exclusivity of task preconditions using at least one of the following: a received satisfiability determination, a determination that the preconditions correspond to different branches of a conditional programming statement, or a determination that the preconditions depend on different respective value ranges of a shared variable.

20. The system of claim 15, wherein at least three preconditions are mutually exclusive of one another, the tasks corresponding to the at least three preconditions are mapped to the same computational location as one another, and the system has a greater co-allocation of computational resources by the tasks than if the tasks had been mapped to two or more different computational locations.

* * * * *